Patented June 28, 1927.

1,633,948

UNITED STATES PATENT OFFICE.

ALEXANDER NATHANSOHN, OF BAD HARZBURG, GERMANY.

PRODUCING LEAD COMPOUNDS OF CHROMIC ACIDS.

No Drawing. Application filed November 19, 1924, Serial No. 750,960, and in Germany September 18, 1924.

The insoluble lead compounds of the chromic acids, etc., are hitherto prepared from soluble lead salts, which are directly or indirectly obtained from metallic lead. The present process avoids this way and uses directly lead containing ores, metallurgical products, waste products of chemical processes, especially those containing lead sulphate as for instance lead chamber mud.

The lead containing ores, slags, lead chamber mud or such like are lixiviated with aqueous solutions of a chloride of the alkali or alkali-earth metal group or magnesium. If the raw materials contain much bases one may neutralize them and may use a surplus of acids over. One may also use acid salts, generally substances of acid action, wherein a surplus of the said substances over the neutralization may be used. Preferably one treats with a small surplus of hydrochloric acid over the amount required for neutralization, the surplus being stated by the beginning production of a blue coloration of a Congo red solution. Then one neutralizes with calcium carbonate, so that the blue colour of the Congo red indicator is destroyed and the mixture shows feeble acid reaction against litmus as indicator. One may treat the mixture with oxidizing agents, as introduced for instance air, oxygen, chlorine, bromine, water soluble chlorates for precipitating dissolved iron in the form of ferric hydroxide. In order to eliminate undesired metals one may subject the turbid mixture of the raw materials and chlorides or/and acids, if desired a part of which having been neutralized, or the filtrate of the said mixture, with metallic lead, for instance granulated or spongy lead, whereby silver, dissolved in strong chloride solutions, is precipitated. The turbid mixture is filtered or clarified in any other suitable manner, for instance by decantation. The liquid contains the lead in the form of complex salts of lead chloride and the used chloride of the nonheavy metals. The lead concentration of the said complex salts may be very high, for instance 9%.

The possibility of making such solutions depends on the fact that most lead compounds, even lead sulphate are easily dissolved in concentrated solutions of a chloride of the alkali or alkali-earth metal group or magnesium. I have now stated from such solutions the lead may be precipitated by water soluble compounds of the chromic acid, which compounds may be used as pigments with reference to their suitable colour and covering power.

Examples.

1. Preparation of chrome-orange.—One dissolves 200 kg. lead slimes, containing 100 kg. lead in oxidized state, in 3.3 cbm. saturated solution of sodium chloride under addition of 100 kg. hydrochloric acid at 80 degrees centigrade. One adds 3 kg. potassium nitrate for oxidizing the dissolved iron, neutralizes with calcium carbonate and filters. The filtrate is precipitated at 85 degrees centigrade with 350 litres of a solution of 68 kg. potassium bichromate and 49 kg. sodium carbonate, the mixture is agitated for about 1 hour, cooled down to 20 degrees centigrade, decanted, washed by decantation and finally filtered and washed, if desired.

2. Preparation of chrome yellow.—The pure lead-sodium chloride solution, as obtained according to Example 1, is heated to 73 degrees centigrade and then added with 570 litres of a solution of 110 kg. potassium bichromate, 80 kg. sodium carbonate and 66 kg. sodium sulphate having the temperature of 20 degrees centigrade, cooled down to ordinary temperature under agitation, decanted and filtered and washed, if desired.

I claim:—

The process for manufacturing lead compounds of chromic acids which consists in lixiviating lead containing materials with a saturated solution of chloride of an alkali forming metal and precipitating the said solution with water soluble compounds containing the acid radicle of chromium.

In testimony whereof I hereunto affix my signature.

ALEXANDER NATHANSOHN.